(12) United States Patent
Ager

(10) Patent No.: US 11,434,049 B2
(45) Date of Patent: Sep. 6, 2022

(54) COLLAPSIBLE CONTAINER

(71) Applicant: Daniel Ager, Nicasio, CA (US)

(72) Inventor: Daniel Ager, Nicasio, CA (US)

( * ) Notice: Subject to any disclaimer, the term of this patent is extended or adjusted under 35 U.S.C. 154(b) by 407 days.

(21) Appl. No.: 16/676,120

(22) Filed: Nov. 6, 2019

(65) Prior Publication Data

US 2020/0071030 A1    Mar. 5, 2020

Related U.S. Application Data

(63) Continuation-in-part of application No. 15/330,075, filed on Aug. 3, 2016, now abandoned, and a continuation-in-part of application No. 13/969,511, filed on Aug. 17, 2013, now abandoned.

(60) Provisional application No. 62/756,547, filed on Nov. 6, 2018.

(51) Int. Cl.
*B65D 33/02* (2006.01)
*B65D 30/00* (2006.01)
*A01G 9/02* (2018.01)

(52) U.S. Cl.
CPC ............. *B65D 29/00* (2013.01); *A01G 9/026* (2013.01); *B65D 33/02* (2013.01)

(58) Field of Classification Search
CPC ......... B65D 29/00; B65D 33/02; A01G 9/026
See application file for complete search history.

(56) References Cited

U.S. PATENT DOCUMENTS

| 1,863,418 | A | * | 6/1932 | Sieling | .................. | A47J 31/446 |
| | | | | | | 248/94 |
| 1,961,947 | A | * | 6/1934 | Sieling | .................. | A47J 31/446 |
| | | | | | | 383/102 |
| 2,594,410 | A | | 4/1952 | Feldspausch | | |
| 2,894,636 | A | * | 7/1959 | Dick | ...................... | A47G 19/14 |
| | | | | | | 248/94 |
| 2,960,798 | A | | 11/1960 | Lindstaedt | | |
| 3,709,263 | A | | 1/1973 | Jackson | | |
| 3,775,903 | A | | 12/1973 | Pike | | |
| 4,026,340 | A | * | 5/1977 | Sobolik | ................ | B65D 33/007 |
| | | | | | | 383/33 |

(Continued)

FOREIGN PATENT DOCUMENTS

WO    WO 9001255    2/1990

*Primary Examiner* — Michael H Wang

(57) ABSTRACT

A collapsible container made up of a bottom portion and a side wall that define an interior, wherein the bottom portion and the side wall are made of a foldable material, a top portion with an opening that allows access to the interior, and a rim member connectable to the top portion and sized and shaped to extend around the perimeter of the opening. The collapsible container is positionable in an open configuration where the rim member in connected to the top portion in a manner than maintains the opening in an open position. The collapsible container is also positionable in a collapsed configuration where at least a portion of the rim member is disconnected from the top portion. In one version, when in the collapsed configuration, the collapsible container takes on a substantially flat shape having a longest dimension less than the longest dimension of the opening when the collapsible container is in the open configuration. In one version, the rim member which may be in the form of a collapsible hoop is contained within the collapsed container when in the collapsed configuration.

18 Claims, 16 Drawing Sheets

(56) References Cited

U.S. PATENT DOCUMENTS

| | | | |
|---|---|---|---|
| 4,224,754 A | 9/1980 | Derryberry | |
| 4,825,578 A | 5/1989 | Robinson | |
| 4,979,833 A * | 12/1990 | Cook | A45C 3/00 |
| | | | 383/117 |
| 5,118,201 A * | 6/1992 | Cook | A45C 3/045 |
| | | | 383/74 |
| 5,430,980 A | 7/1995 | Ferrier | |
| 5,544,447 A | 8/1996 | Easey | |
| 5,743,651 A * | 4/1998 | Steinmetz | B65F 1/1415 |
| | | | 383/33 |
| 5,964,533 A | 10/1999 | Ziglar | |
| 6,088,953 A * | 7/2000 | Morgan | A01G 13/043 |
| | | | 47/20.1 |
| 6,494,335 B1 * | 12/2002 | Kellogg | D06F 95/004 |
| | | | 220/9.3 |
| 6,616,004 B1 | 9/2003 | Erickson | |
| 6,637,155 B1 | 10/2003 | Butler | |
| 6,830,170 B2 | 12/2004 | Abel | |
| 7,350,547 B2 * | 4/2008 | Quiring | B65B 67/1238 |
| | | | 141/391 |
| 7,494,096 B2 * | 2/2009 | Paloian | B65B 67/1255 |
| | | | 141/391 |
| 7,815,069 B1 | 10/2010 | Bellafatto | |
| 7,815,372 B2 | 10/2010 | Stanton | |
| 7,870,838 B2 | 1/2011 | Madsen | |
| 7,941,966 B2 | 5/2011 | Foix Robert | |
| 7,988,681 B2 * | 8/2011 | McGarity | A61J 19/00 |
| | | | 383/73 |
| 8,333,351 B2 * | 12/2012 | Kramer | B65D 33/007 |
| | | | 248/95 |
| 8,511,895 B2 * | 8/2013 | Burchfield | B65F 1/1415 |
| | | | 383/33 |
| 9,179,608 B2 | 10/2015 | Kempf | |
| 9,398,746 B1 | 7/2016 | Schweitzer | |
| 9,499,291 B2 * | 11/2016 | Verma | B65D 33/2508 |
| D852,641 S | 7/2019 | Patten | |
| 10,494,146 B2 * | 12/2019 | Verma | B65D 33/00 |
| 2002/0030052 A1 * | 3/2002 | Joo-Tai | D06F 95/002 |
| | | | 220/9.2 |
| 2003/0106895 A1 * | 6/2003 | Kalal | B65D 21/086 |
| | | | 220/9.2 |
| 2004/0173611 A1 * | 9/2004 | Sabounjian | B65D 33/02 |
| | | | 220/9.4 |
| 2005/0166451 A1 | 8/2005 | Stachnik | |
| 2005/0265636 A1 | 12/2005 | Michalsky | |
| 2005/0284866 A1 * | 12/2005 | Oakner | B65F 1/1415 |
| | | | 220/9.2 |
| 2006/0186119 A1 | 8/2006 | Zheng | |
| 2007/0157513 A1 | 7/2007 | Varney | |
| 2007/0257034 A1 | 11/2007 | Sabounjian | |
| 2009/0151242 A1 | 6/2009 | Kellogg | |
| 2011/0203176 A1 | 8/2011 | Nelson | |
| 2011/0232175 A1 | 9/2011 | Cirello | |

* cited by examiner

COLLAPSIBLE CONTAINER

PRIORITY

The present application claims the benefit of domestic priority based on United States Provisional Patent Application 62/756,547 filed on Nov. 6, 2018, the entirety of which is incorporated herein by reference, and is a Continuation-in-part of U.S. patent application Ser. No. 15/330,075 filed on Aug. 3, 2016 which is a Continuation-in-part of U.S. patent application Ser. No. 13/969,511 filed on Aug. 17, 2013, both of which are incorporated herein by reference in their entireties.

BACKGROUND

Since its earliest days, mankind has grappled with the problem of how to easily and conveniently contain materials, such as water, soil, and other items. The problem is as relevant today as ever.

Containers are often large, heavy, cumbersome, and difficult to store. Most homes in America have a stack of five-gallon buckets taking up space in a garage or other storage area. The problem is even worse for companies that manufacture, sell, and/or ship the containers, especially when thousands of empty containers need to be stored and transported.

Collapsible containers have been developed, but existing collapsible containers suffer from various drawbacks. For example, most collapsible containers do not maintain a sufficiently rigid structure on their own and do not stay open by themselves which makes filling a challenge. In addition, soft containers that are designed to pop-up or otherwise keep their shape in use have sides that are wrinkled and unattractive to consumers when they are expanded. More importantly, containers that have a cylindrical shape when in use have a circular shape or cross-section when collapsed. Circular packages create significant amounts of wasted space when stored in large quantities as opposed to packages with a square or rectangular cross-section which can be stacked and arranged in storage with much less wasted space. During shipping this wasted space is an even greater concern as it increased the shipping costs and the fuel consumption.

Versions of collapsible fabric plant pots are disclosed in U.S. patent application Ser. No. 13/457,921 filed on May 9, 2012 and in U.S. patent application Ser. No. 15/330,075 filed on Aug. 3, 2016, both of which are incorporated herein by reference in their entireties. These fabric pots contain vertical supports in the form of wires and/or a skeletal structure that make the designs difficult to wash because of the sewn in wires. Furthermore, the vertical supports are extra pieces that must be assembled and can be lost during shipping.

There is therefore a need for a collapsible container that has an improved design. There is further a need for a collapsible container that stays open on its own without a rigid vertical skeleton. There is still further a need for a collapsible container that collapses into a small footprint that is convenient and/or efficient to store, such as a substantially square or rectangular shape. There is still further a need for a collapsible container that can be stored and shipped without loose parts that can be lost.

SUMMARY

The present invention satisfies these needs. In one aspect of the invention, an improved collapsible container is provided.

In another aspect of the invention, a collapsible container stays open on its own without a rigid vertical skeleton.

In another aspect of the invention, a collapsible container collapses into a small footprint that is convenient and/or efficient to store, such as a substantially square or rectangular shape.

In another aspect of the invention, a collapsible container can be stored and shipped without loose parts that can be lost.

In another aspect of the invention, a collapsible container comprises a bottom portion and a side wall that define an interior, wherein the bottom portion and the side wall are made of a foldable material, a top portion with an opening that allows access to the interior, and a rim member connectable to the top portion and sized and shaped to extend around the perimeter of the opening, wherein the collapsible container is positionable in an open configuration where the rim member in connected to the top portion in a manner than maintains the opening in an open position, wherein the collapsible container is positionable in a collapsed configuration where at least a portion of the rim member is disconnected from the top portion, and wherein in the collapsed configuration, the collapsible container takes on a substantially flat shape having a longest dimension less than the longest dimension of the opening when the collapsible container is in the open configuration.

In another aspect of the invention, a collapsible container comprises a bottom portion and a side wall that define an interior, wherein the bottom portion and the side wall are made of a foldable material; a top portion with an opening that allows access to the interior; and a rim member connectable to the top portion and sized and shaped to extend around the perimeter of the opening, wherein collapsible container is positionable in an open configuration where the rim member in connected to the top portion in a manner than maintains the opening in an open position, wherein the collapsible container is positionable in a collapsed configuration where at least a portion of the rim member is disconnected from the top portion, and wherein the rim member is contained within the collapsed container when in the collapsed configuration.

In another aspect of the invention, a collapsible container comprises a bottom portion and a side wall that define an interior, wherein the bottom portion and the side wall are made of a foldable material; a top portion with an opening that allows access to the interior; and a rim member connectable to the top portion and sized and shaped to extend around the perimeter of the opening, wherein collapsible container is positionable in an open configuration where the rim member in connected to the top portion in a manner than maintains the opening in an open position, wherein the collapsible container is positionable in a collapsed configuration where at least a portion of the rim member is disconnected from the top portion, and wherein the rim member is contained within the collapsed container when in the collapsed configuration, wherein the side wall is cylindrical, wherein the opening is circular, and wherein the rim member is a wire in the form of a circular hoop that is a collapsible hoop.

In another aspect of the invention, a method of collapsing a container comprises providing a collapsible container comprising a bottom portion and a side wall that define an interior, wherein the bottom portion and the side wall are made of a foldable material, a top portion with an opening that allows access to the interior, and a rim member connectable to the top portion and sized and shaped to extend around the perimeter of the opening; maintaining the collapsible container in an open position by connecting the rim member to the top portion in a manner that maintains the opening in an open position; disconnecting at least a portion of the rim member from the top portion; and folding the bottom portion and the side wall to collapse the collapsible container into a collapsed configuration, wherein the rim member is contained within the collapsed configuration and wherein in the collapsed configuration.

In another aspect of the invention, a method of collapsing a container comprises providing a collapsible container comprising a bottom portion and a side wall that define an interior, wherein the bottom portion and the side wall are made of a foldable material, a top portion with an opening that allows access to the interior, and a rim member connectable to the top portion and sized and shaped to extend around the perimeter of the opening; maintaining the collapsible container in an open position by connecting the rim member to the top portion in a manner that maintains the opening in an open position; disconnecting at least a portion of the rim member from the top portion; and folding the bottom portion and the side wall to collapse the collapsible container into a collapsed configuration, wherein in the collapsed configuration, the collapsible container takes on a substantially flat shape having a longest dimension less than the longest dimension of the opening when the collapsible container is in the open configuration.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a collapsible container. In particular, the invention relates to a collapsible container with a supported opening. Although the invention is illustrated and described in the context of being useful for containing items, water, soil, and the like, the present invention can be useful in other instances. Accordingly, the present invention is not intended to be limited to the examples and embodiments described herein.

Figure 1:
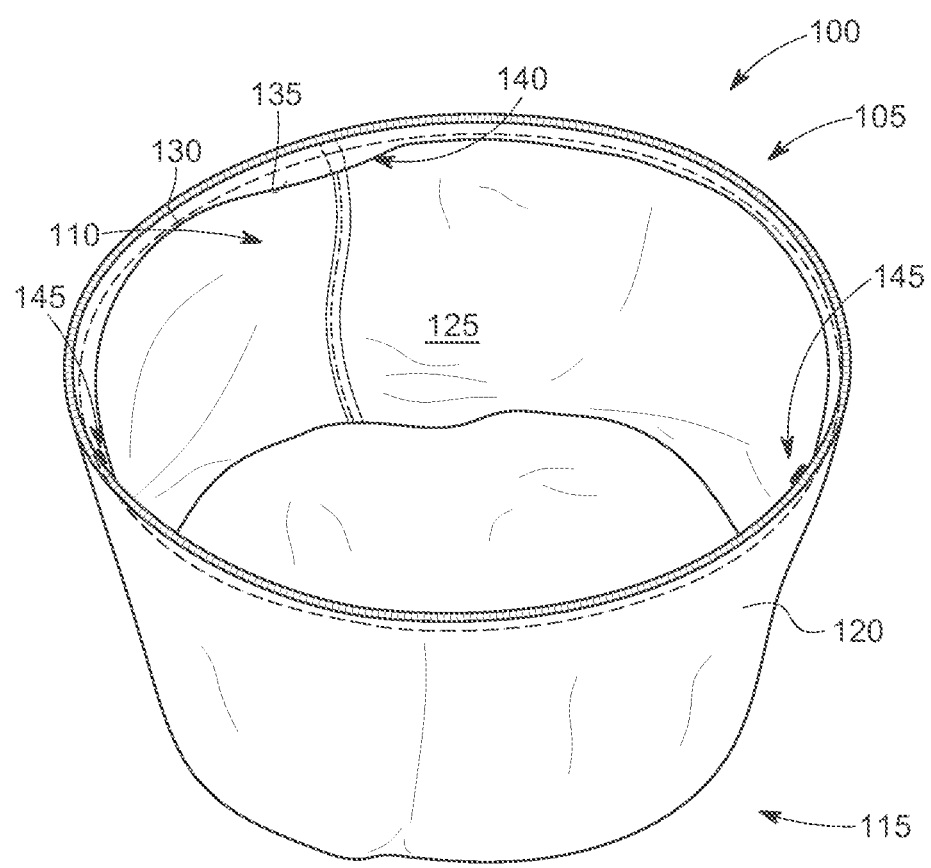
FIG. 1 is a schematic perspective view showing a collapsible container according to the invention in an open and ready to use configuration.

FIG. 1 shows a collapsible container 100 according to a version of the invention. The collapsible container 100 has a top portion 105 having an opening 110, a bottom portion 115, and a side wall 120 connecting the top portion 105 and the bottom portion 110. In the version shown in FIG. 1, the top portion 105 and opening 110 are circular, the bottom portion 115 is circular, and the side wall is correspondingly cylindrical with a circular cross-section. However, in other versions, the top portion 105, opening 110, bottom portion 115, and side wall 120 can take on any other geometrical shape. The bottom portion 115 and sidewalls 120 define an interior 125, and the opening 110 provides access to the interior 125.

The side wall 120 is made of a material that is sufficiently rigid to not collapse on its own yet sufficiently foldable. By foldable it is meant that the material can be folded by hand without the need for any tools. The bottom portion 115 can be made of the same or a different material. In one version, the side wall 120 and the bottom portion are water permeable. In this version, the collapsible container 100 can be used to hold soil and/or various other items. In another version, the side wall 120 and bottom portion 115 are water impermeable. In this version, the collapsible container 100 can be used to hold water or other liquid or any material that does not need to have water pass through the side wall 120 and/or bottom portion 115. For the water-permeable version, examples of materials for the side wall 120 and/or bottom portion 115 include one or more of a woven or non-woven geotextile fabric, any other fabric material, any polymer, any polymer-based fabric, either biodegradable or non-biodegradable, any plant-based fabric material, such as cotton, hemp, burlap, jute, bamboo, paper/cardboard composite, PLA, biodegradable composite material, and the like. For the water-impermeable version, examples of materials for the side wall 120 and/or bottom portion include one or more of polymer, plastic such as polypropylene, polyester, polyethylene, PVC, and/or ABS, leather or other animal based byproduct, cellulose based material, and the like. The side wall 120 can have handles or can have no handles.

Figure 2:
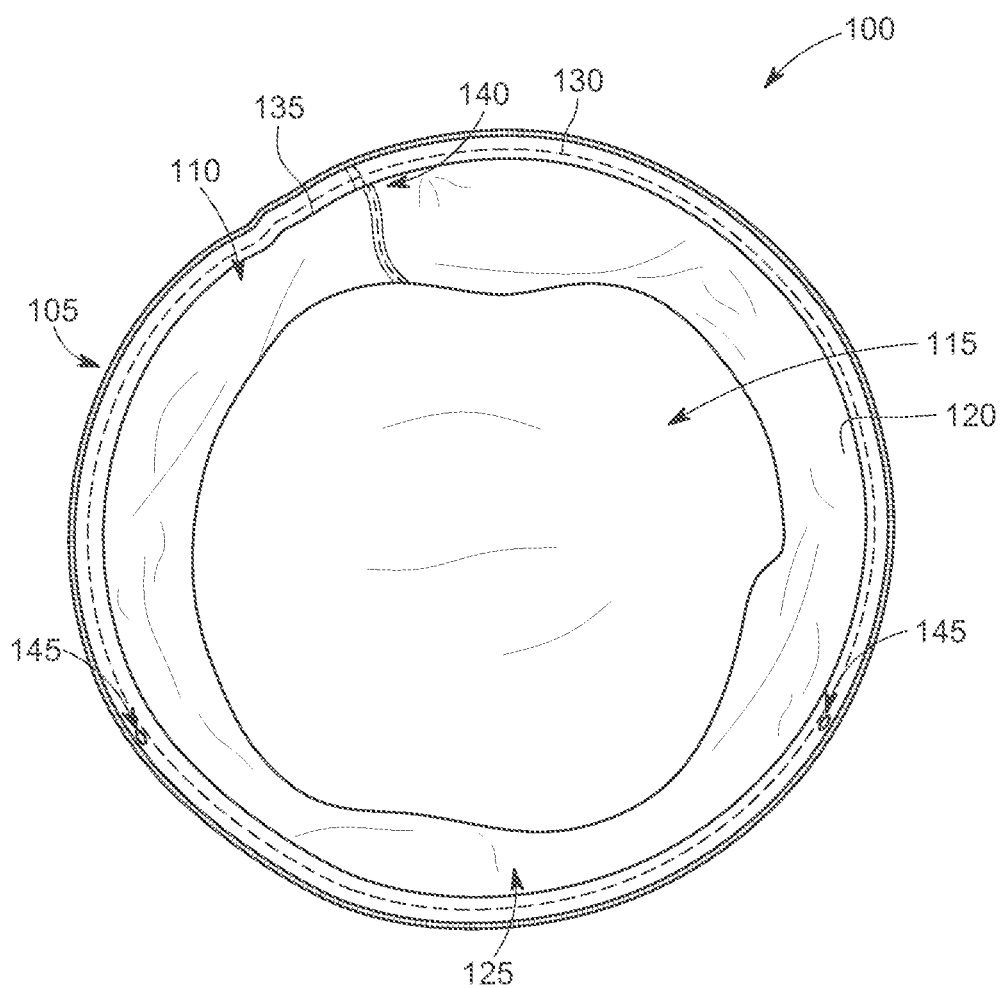
FIG. 2 is a schematic top view of the collapsible container of FIG. 1.
Figure 3:
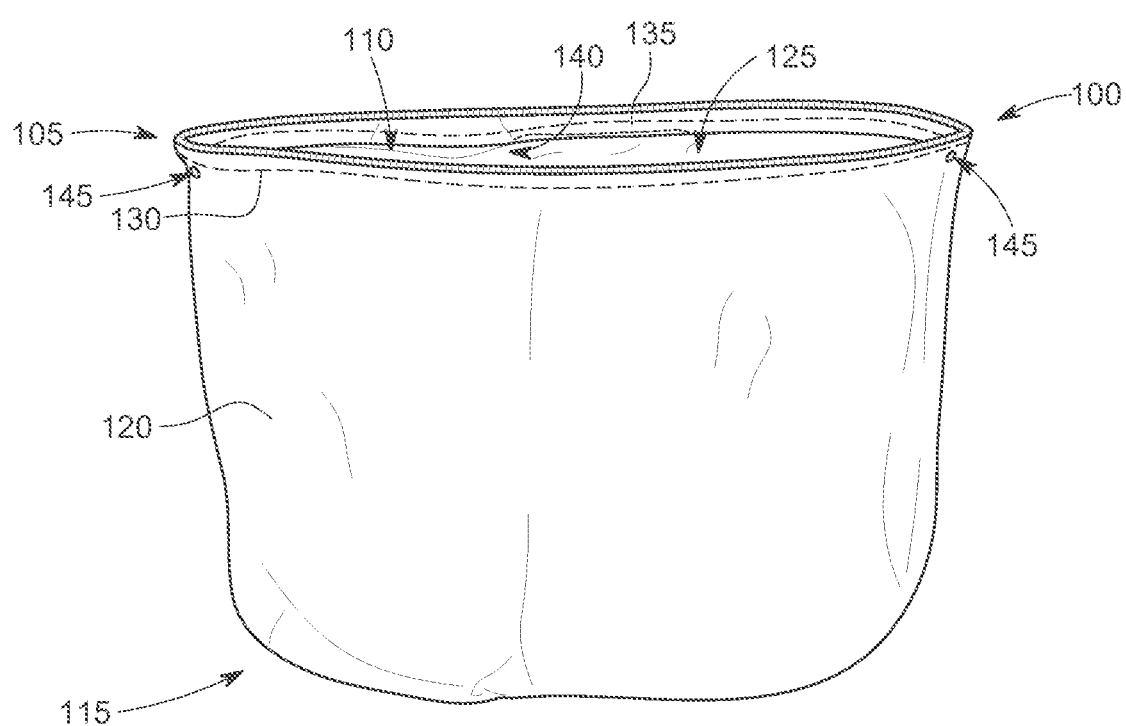
FIG. 3 is a schematic side view of the collapsible container of FIG. 1.
Figure 4:
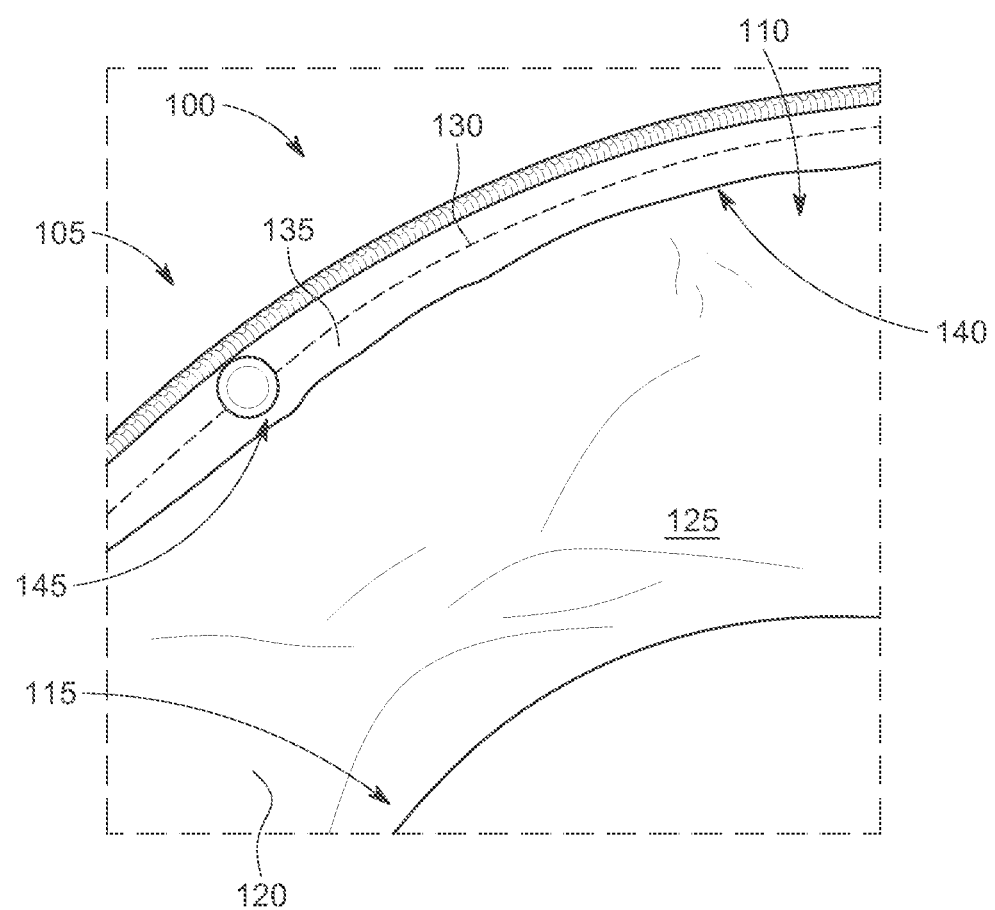
FIG. 4 is a schematic perspective view of the top interior portion of the collapsible container of FIG. 1.

The top portion 105 is held open by a rim member 130 that is sized and shaped to extend around the perimeter or circumference of the opening 110. The rim member 130 can be a wire, tube, rod, or the like, and is sufficiently rigid to maintain the opening 110 in an open configuration so that the interior 125 can be accessed. The rim member 130 can be a wire, tube, rod, or the like made of one or more of metal, fiberglass, biodegradable stick, wicker, paper, cardboard, bamboo, plant based material, polymer, plastic, such as PVC and/or polyethylene, composites and the like and may be a single piece of material or multiple pieces, may be may be braided, stranded, flat, round or other shape, and may be coated or uncoated. The top portion 105 includes a flap 135 of material that creates a pocket 140 around the top of the interior of the collapsible container 100. The rim member 130 is containable within the pocket 140. The rim member 130 when inside the pocket 140 maintains a desired shape and thus maintains the opening 105 in the desired shape, such as the open position or configuration. In the version of FIG. 1, the rim member 130 is a circular wire, and it maintains a circular opening as shown. Alternatively, the rim member may have a different shape, such as oval, ovoid, ovate, egg-shaped, square, rectangular, other polygon, star, heart, other decorative shape, or any other shape. The side wall 120 can have a shape that corresponds shape to the opening 110 and rim member 130 or can have a different shape. One or more fasteners 145, such as a snap, button, Velcro, zipper, zip-lock, or the like, can be provided to fasten the flap 135 to the side wall 120 to retain the rim member 130 in the pocket 140. FIGS. 2 and 3 show top and side views of the collapsible container 100 of FIG. 1. FIG. 4 shows a close-up of the top portion 105 to more closely show the flap 135, pocket 140, and fastener 145.

Figure 5:
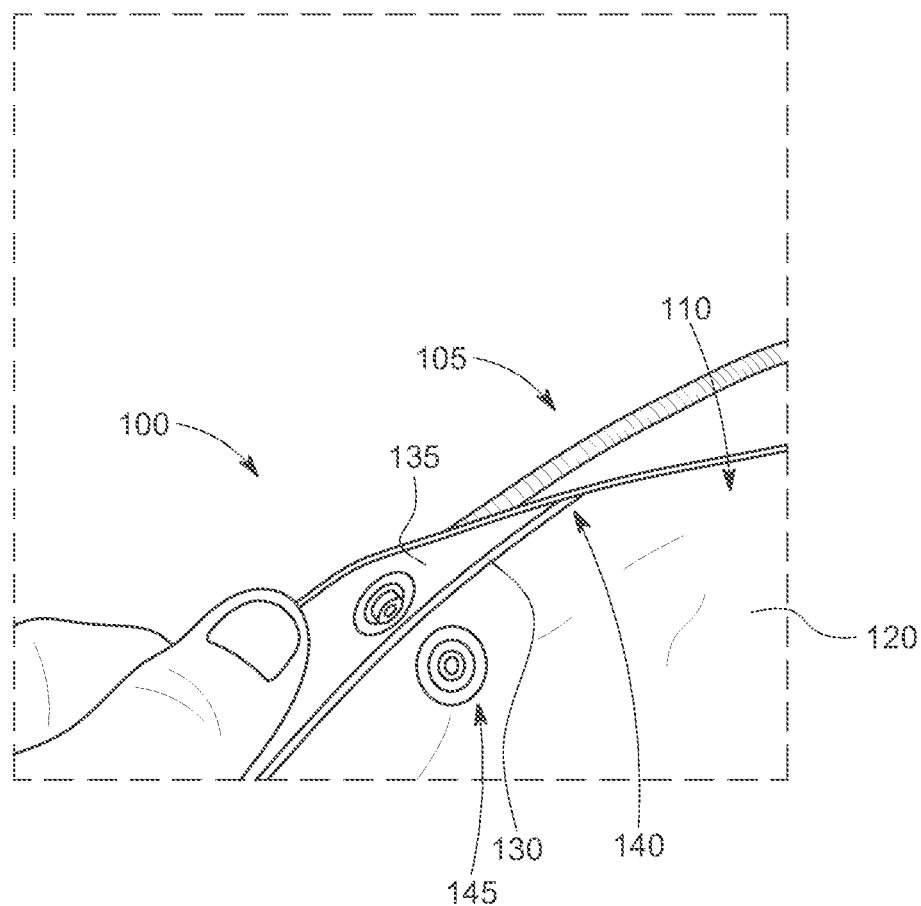
FIG. 5 is a schematic perspective view of the top interior portion of the collapsible container of FIG. 1 showing the top rim member support.
Figure 6:
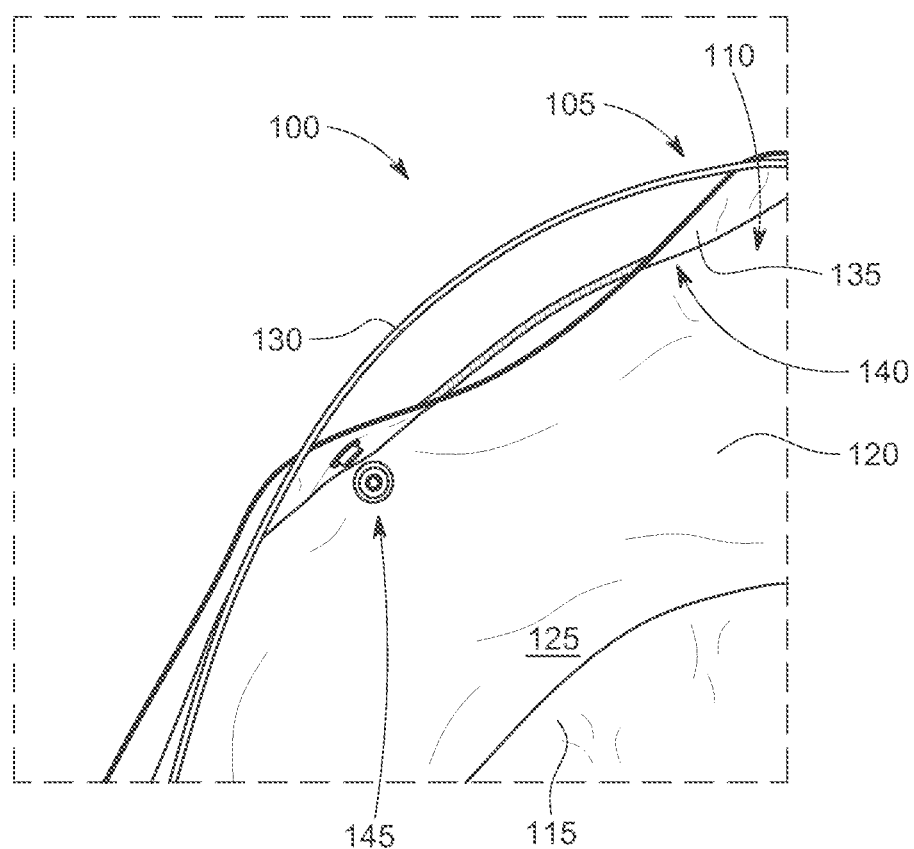
FIG. 6 is a schematic perspective view of the top interior portion of the collapsible container of FIG. 1 showing the top rim member support partially removed from its supporting or open position.
Figure 7:
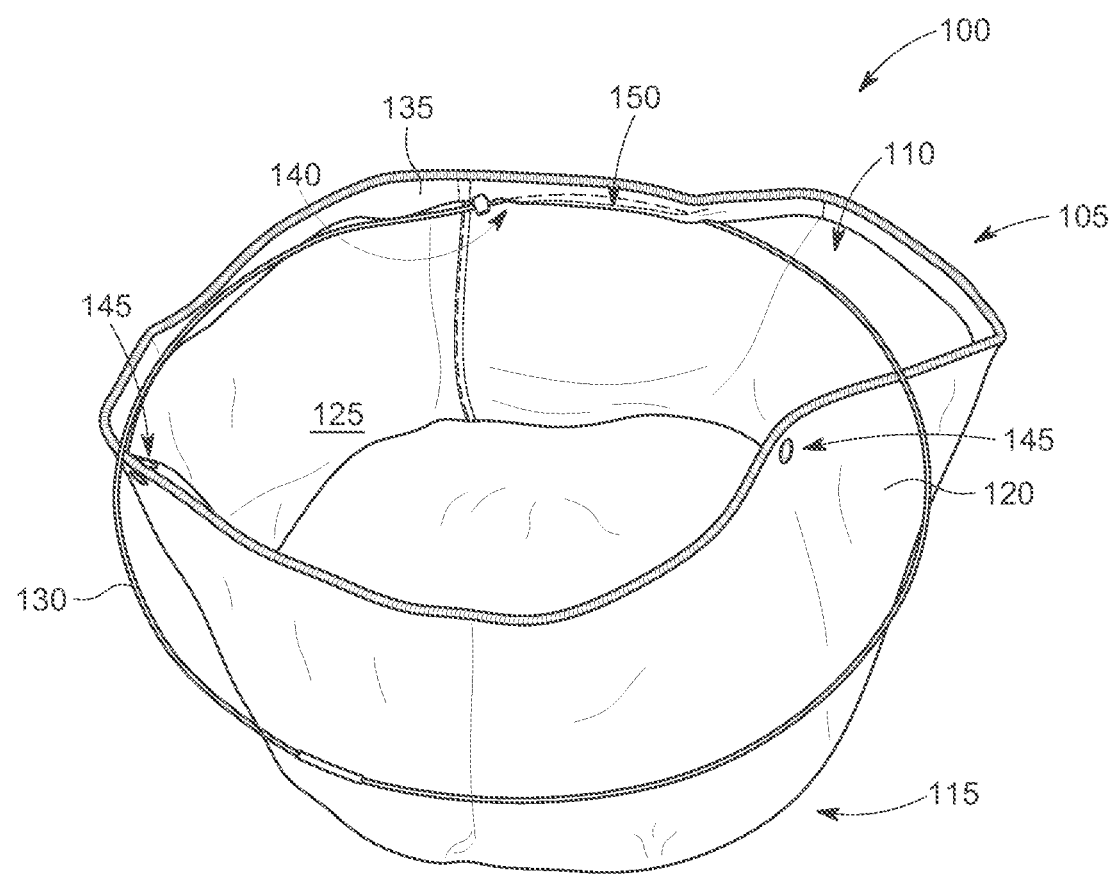
FIG. 7 is a schematic perspective view of the top interior portion of the collapsible container of FIG. 1 showing the top rim member support removed from its supporting or open position.
Figure 8:
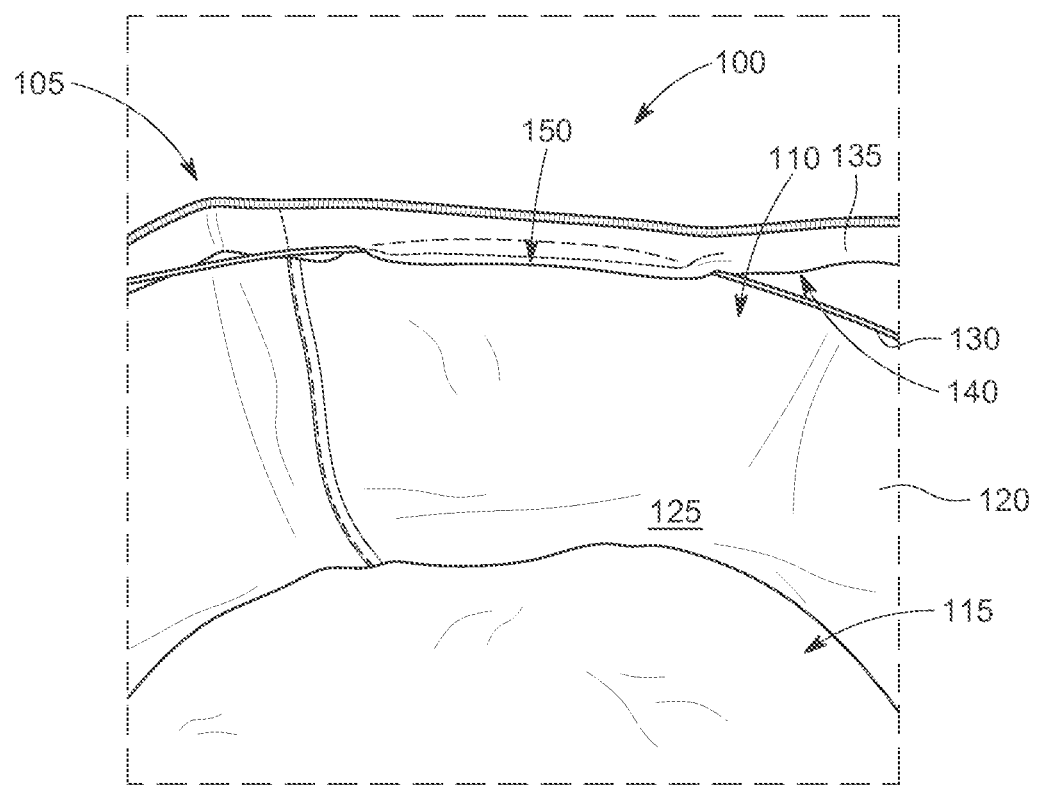
FIG. 8 is a schematic perspective view of the top interior portion of the collapsible container of FIG. 1 showing the top rim member support partially removed from its supporting or open position but still attached to the collapsible container.

The process of collapsing the container 100 will now be described. First, as shown in FIG. 5, the one or more fasters 145 are unfastened to open the pocket 140 and expose the rim member 130. The rim member 130 is removed from the pocket 140, as shown in FIGS. 6 and 7. As can be seen in FIG. 7, when the rim member 130 is mostly removed from the pocket 140 and is at least partially disconnected from the top portion 105, the opening 110 no longer retains its shape. As can also be seen in FIG. 7 and in the close-up of FIG. 8, a portion 150 of the pocket 140 remains closed so that the rim member 130 is retained within that portion 150 of the pocket 145. The portion 150 that remains closed can do so by there being one or more fasteners 145 that remain fastened or can be closed in a more permanent fashion. For example, in the version shown, the portion 150 of the pocket 140 is sewn shut so the rim member 130 is permanently held in the pocket 140 at the portion 150. Alternatively, the entire rim member 130 can be removable from the pocket 140.

After the rim member 130 has been at least partially removed from the pocket 140, the top portion 105 loses at least some of its rigidity, and the opening 110 can be at least partially closed. The side wall 120 and/or the bottom portion 115 can be made of a foldable material that allows them to be moved, bent, and/or folded. In one version, the collapsible container 100 has a circular bottom portion 115 and a cylindrical side wall 120 extending upward from the circular bottom portion 115. The bottom portion 115 and the side wall 120 can be collapsed into a substantially flat configuration, and the substantially flat configuration can be folded over itself at least once and preferably a plurality of times into a substantially flat collapsed or storage configuration with reduced footprint. The rim member 130 can be unattached from the side wall 120 and separately stored, or it may remain attached at the portion 150.

Figure 9:
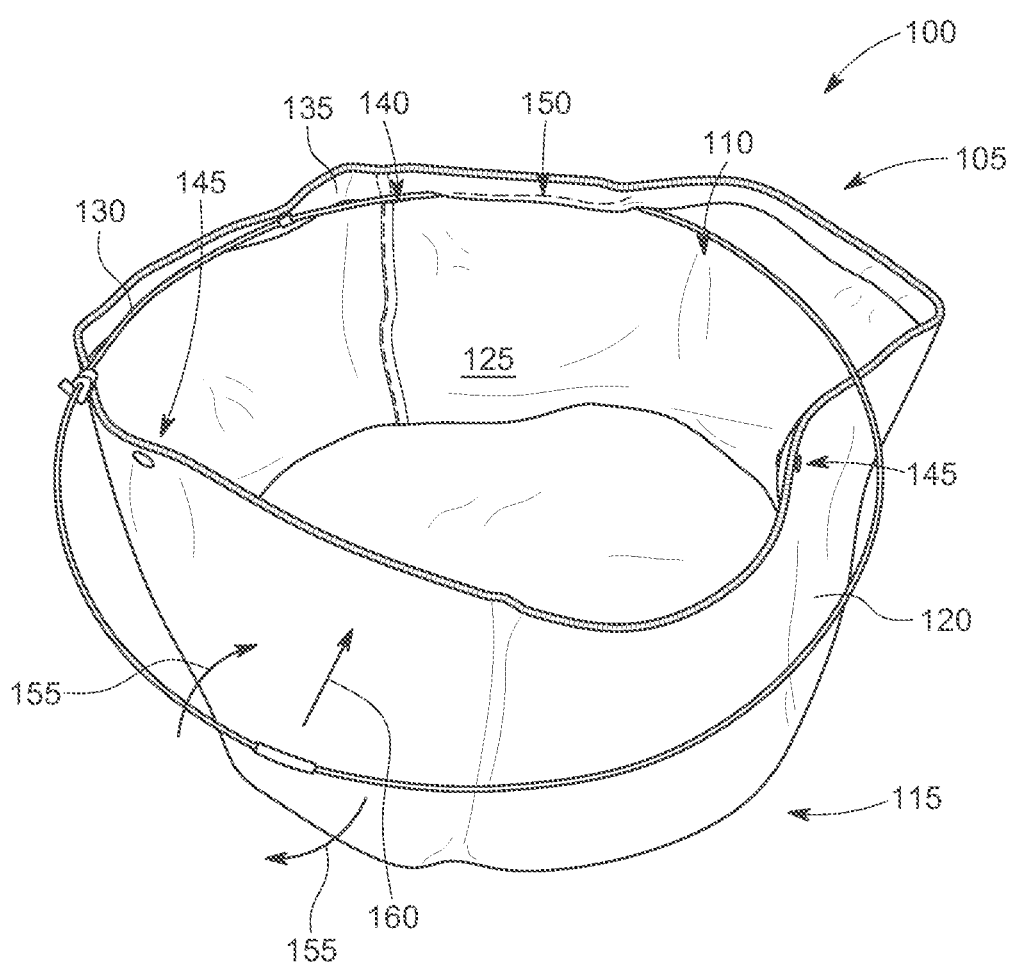
FIG. 9 is a schematic perspective view of the collapsible container of FIG. 1 showing the top rim member support removed from its supporting or open position and being moved into a storage position.
Figure 10:
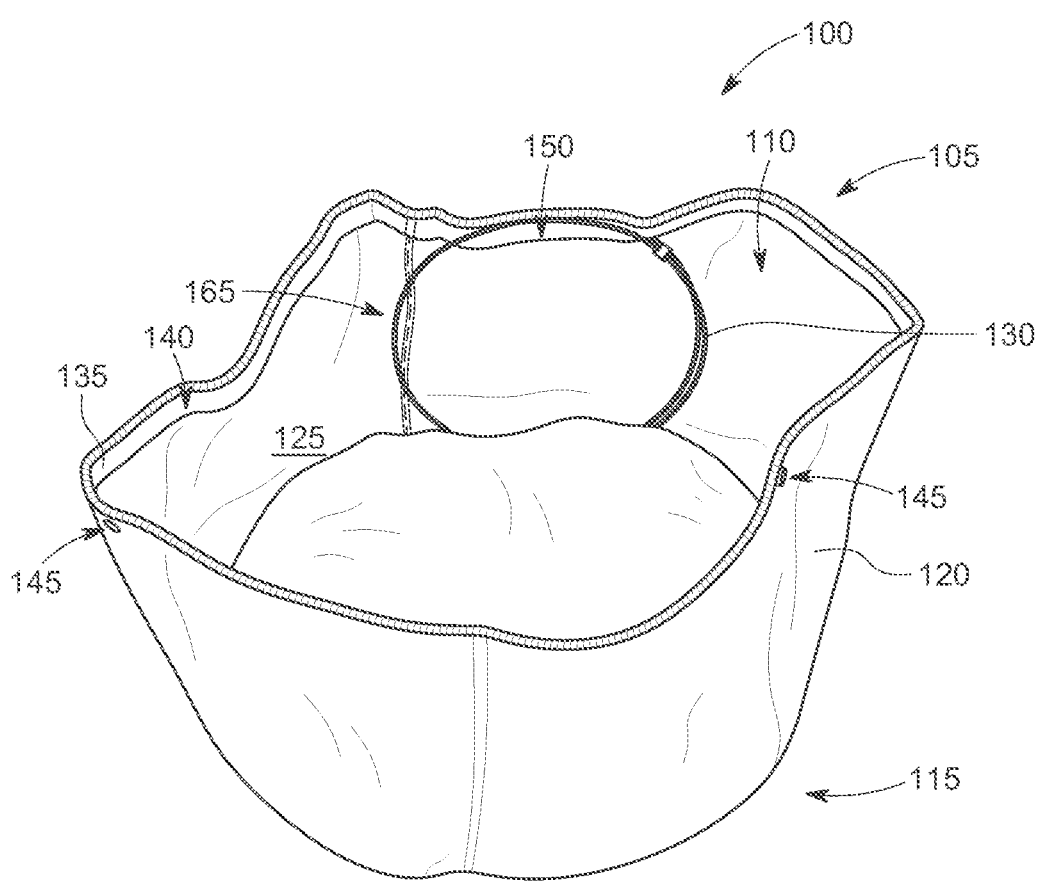
FIG. 10 is a schematic perspective view of the collapsible container of FIG. 1 showing the top rim member support in a storage position.
Figure 11:
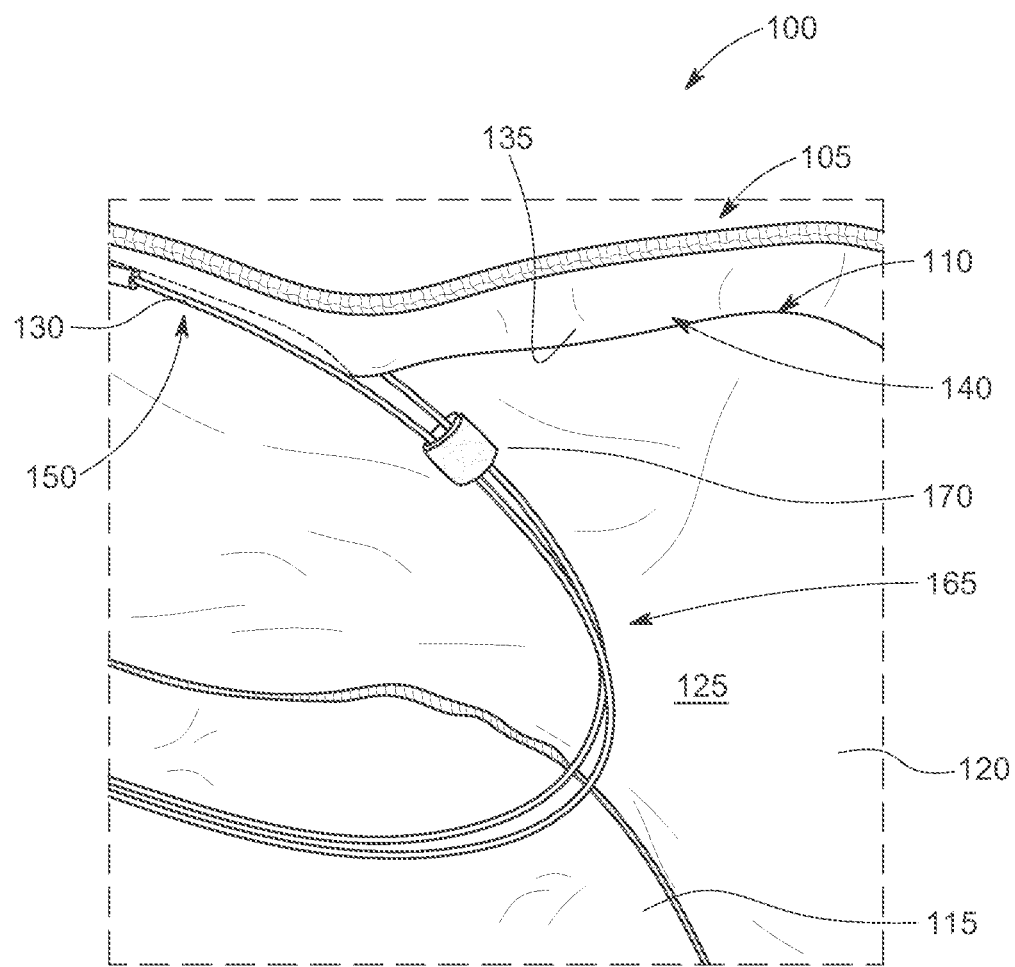
FIG. 11 is a schematic perspective view of the collapsible container of FIG. 1 showing the top rim member support in a storage position and fasteners for maintaining it in the storage position.

In one version, the rim member 130 is designed to be able to be stored within the substantially flat, collapsed configuration of the collapsible container 100. For example, in one version, such as the one shown in FIG. 9, the rim member 130 can be in the form of a wire that is a collapsible hoop. As shown in FIG. 9, after the rim member 130 has been at least partially removed from the pocket 145, the rim member 130 can be twisted 155 and pushed inward 160 to make a FIG. 8 shape, and then the FIG. 8 can be folded over itself to form a double wire 165 that has a reduced dimension, as shown in FIG. 10. For example, for this specific version, the rim member 130 is circular in its unfolded or uncollapsed configuration and can be twisted and folded to be a double circle 155 having a radius about half that of the original circle. One or more straps 170, preferably two or more, can be provided to secure the rim member 130 in its double wire 165 configuration. The straps 170 can be Velcro, ties, snaps, or the like. Alternatively, a brace, snap, clip, or the like can be used to maintain the rim member 130 in its collapsed position.

Figure 12:
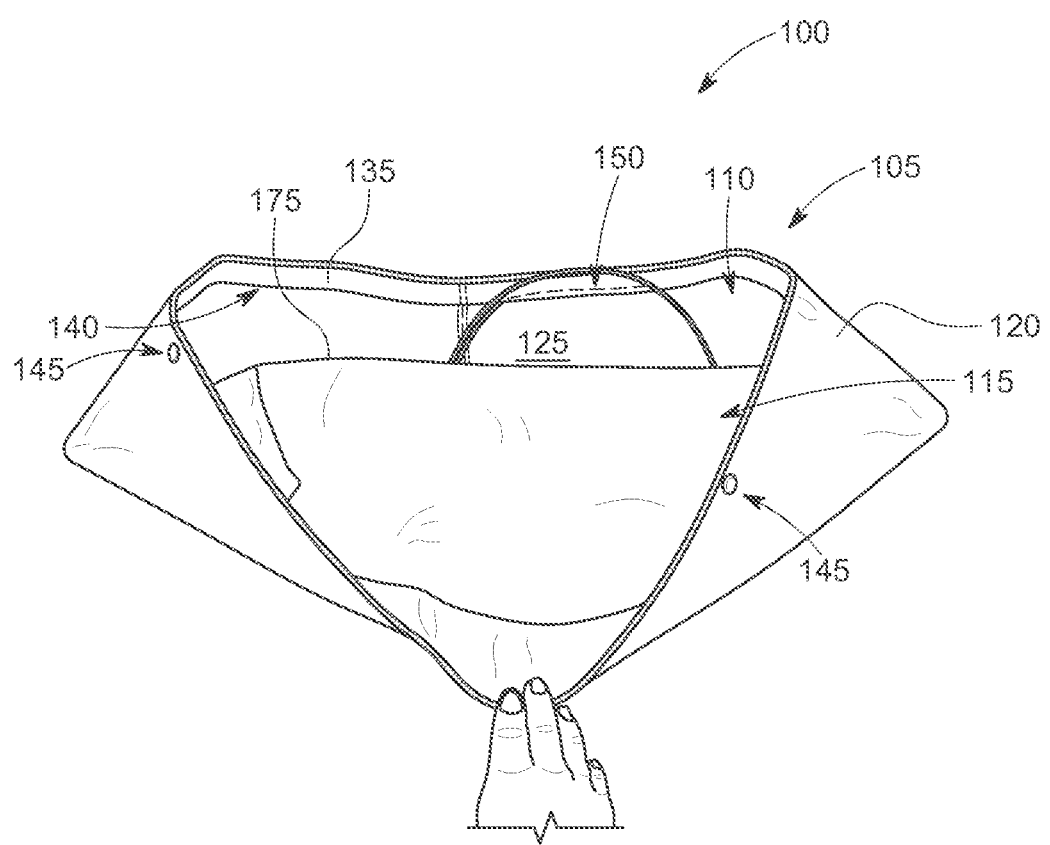
FIG. 12 is a schematic perspective view of the collapsible container of FIG. 1 showing the top rim member support in a storage position and with the collapsible container starting to be collapsed.
Figure 13:
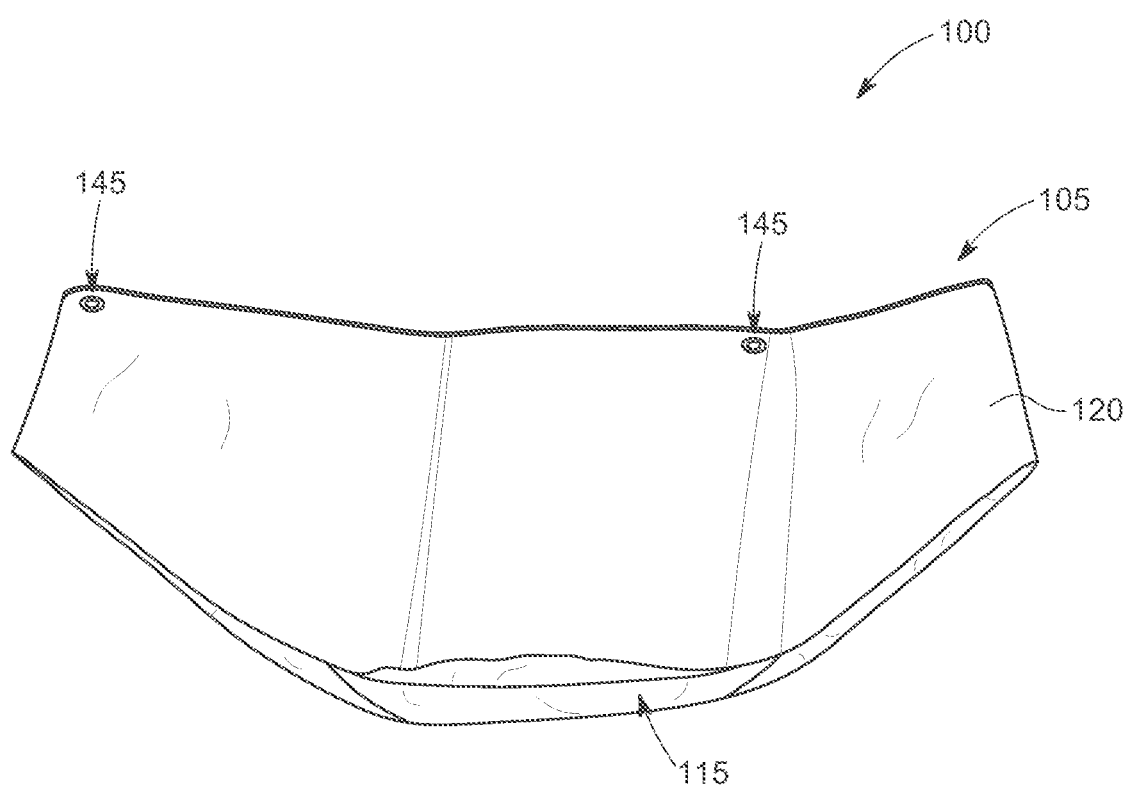
FIG. 13 is a schematic perspective view of the collapsible container of FIG. 1 continuing to be collapsed.
Figure 14:
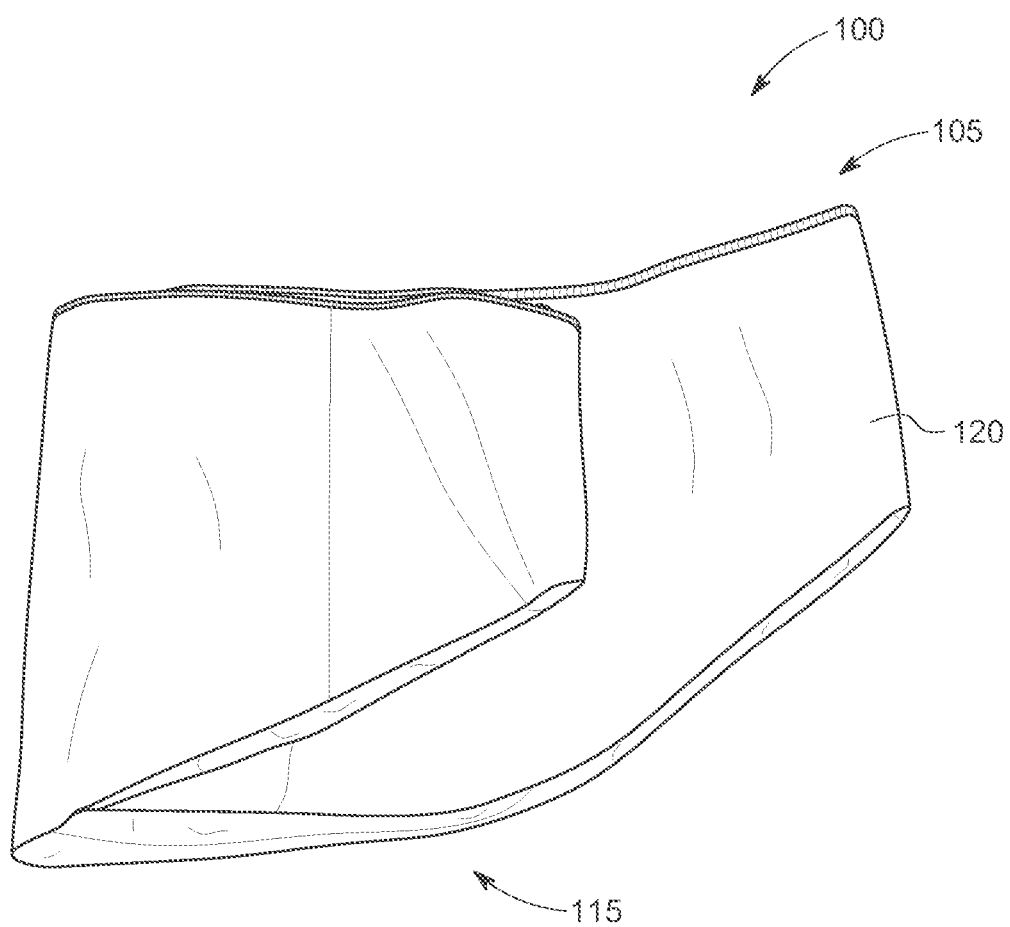
FIG. 14 is a schematic perspective view of the collapsible container of FIG. 1 continuing to be collapsed further.
Figure 15:
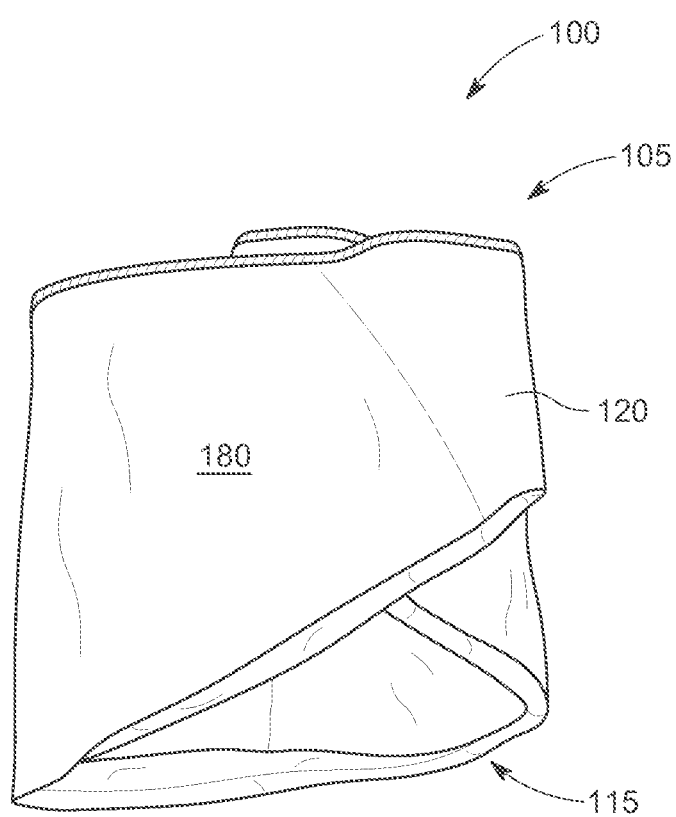
FIG. 15 is a schematic perspective view of the collapsible container of FIG. 1 in a fully collapsed condition or configuration.
Figure 16:
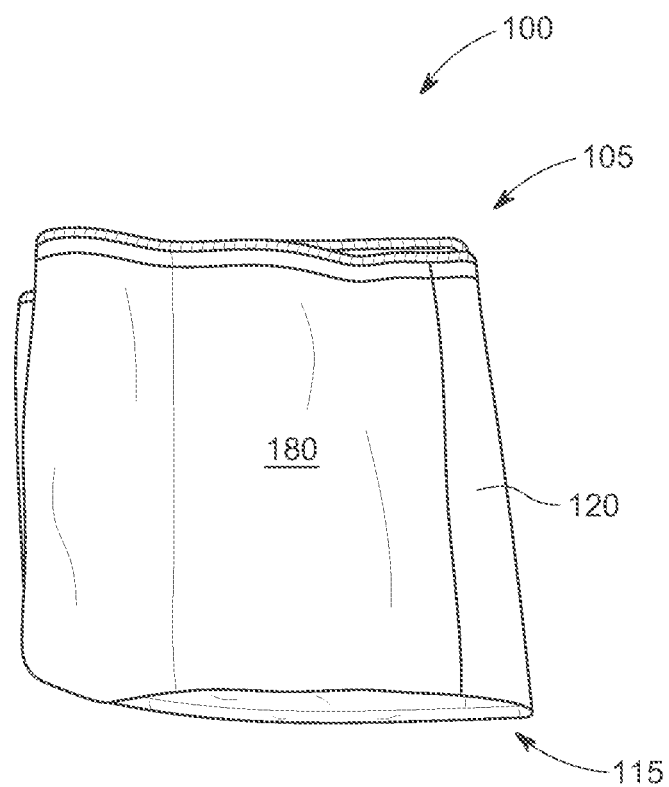
FIG. 16 is a schematic perspective view of the collapsible container of FIG. 1 in the fully collapsed condition or configuration of FIG. 15 but flipped over.

After the rim member 130 is removed or doubled over 165, the bottom portion 115 and the side wall 120 can be folded into a collapsed position. First, as shown in FIG. 12, the bottom portion 115 can be folded in half at its diameter with the fold 175 being pushed into the interior 125 of the collapsible container 100. The side wall 120 is then folded in half to sandwich the folded bottom portion 110, as shown in FIG. 13. The side wall 120 can then be folded over itself, as shown in FIGS. 14 and 15, for example in thirds, to place the collapsible container 100 in its collapsed position 180 of FIG. 15. FIG. 16 shows the collapsible container 100 in its collapsed position 180 flipped over from the FIG. 15.

In the collapsed configuration 180, or storage configuration, the collapsible container 100 can be substantially square or rectangular. As a result, the collapsible container is easily storable and shippable in a form that requires significantly less space than if the collapsible container maintained its original cross-sectional shape. The collapsible containers 100 in their collapsed configuration 180 can be stacked into a warehouse or shipping container and will make efficient of the space available.

The present collapsible container 100 thus has the ability to be in a cylindrical shape and have a rigidly maintained opening 110 when in an open configuration and the ability to collapse down into a storage or collapsed configuration 180 that has a longest dimension that is less than the diameter of the opening 110 or the longest dimension of the opening if the opening is a shape other than circular. For example, in the specific version shown, the collapsible container 100 has a rim member 130 having a diameter of about 24 inches when not doubled over, and the container has about a 30-gallon interior. In the collapsed configuration 180, the container 100 collapses into a configuration that is about a 14 inch by 14 inch square. The doubled-over collapsed rim member 130 has a doubled-over diameter of about 12 inches, and then the folded material makeup the rest of the dimension. Other volume interiors can be similarly and correspondingly collapsed. For example, in another particular version, the collapsible container 100 has a 400-gallon interior with a 70 inch diameter and a 24 inch height. The diameter and height ratio can be varied so the container can be more shaped like a barrel.

Therefore, for any diameter rim member 130 and opening 110, the collapsible container 100 can be collapsed down into a substantially flat collapsed configuration containing the rim member 130 and that has a largest dimension less than the diameter of the open rim member 130, or less than about 75% of the diameter of the open rim member 130, or less than about 65% of the open rim member 130, or less than about 60% of the diameter of the open rim member. In another version, the collapsed configuration can take on a more elongated flatted rectangular shape. In this version, the sum of the two lengths of the rectangular shape in the collapsed configuration are less than two times the diameter of the open rim member 130, or less than about 75% of two times the diameter of the open rim member 130, or less than about 65% of two times the diameter of the open rim member 130, or less than about 60% of two times the diameter of the open rim member 130. For non-circular rim member versions, such as oval or the like, the longest dimension of the open rim member can be substituted for the diameters listed above.

In another version, the rim member 130 may be further twisted and again doubled over itself to make a four hoop collapsed version that has a diameter one-quarter the size of the open rim member 130. Thus, in this version, for any diameter rim member 130 and opening 110, the collapsible container 100 can be collapsed down into a substantially flat collapsed configuration containing the rim member 130 and that has a largest dimension less than the about 50% of the diameter of the open rim member 130, or less than about 40% of the open rim member 130, or less than about 30% of the diameter of the open rim member. In another version, the collapsed configuration can take on a more elongated flatted rectangular shape. In this version, the sum of the two lengths of the rectangular shape in the collapsed configuration are less than the diameter of the open rim member 130, or less than about 80% of the diameter of the open rim member 130, or less than about 65% of the diameter of the open rim member 130.

The collapsible container 100 can be stored and shipped in its collapsed position 180. Then, to open the collapsible container 100, one merely reversed the steps outlined above. The side wall 120 and bottom portion 110 are unfolded, the straps 170 are removed and the rim member 130 is unfolded, and the rim member is inserted into the pocket 140 and secured therein by the fasteners 145. The interior 125 can then be filled as desired.

In one version, the collapsible container 100 includes a bottom portion 115 and a side wall 120 that consist essentially of the foldable material and/or have no rigid vertical skeleton or rigid vertical supports. In this version, there is no rigid supporting structures associated with or connected to the bottom portion 115 and the side wall 120. The only rigid structure in this version is the rim member 130. In one particular version, the side wall 120 is made of a foldable material that is sufficiently thick that the side wall stands upright when the rim member 130 is connected to the top portion 105 in the open configuration. In one version, the bottom portion 115 and side wall 120 are each two separate parts made from the same or different materials. The bottom portion 115 may have a flat bottom surface so the collapsible container 100 can sit on a flat surface when in the open configuration or may be curved without a flat surface. In another version, the bottom portion 115 and the side wall 120 are a single piece of continuous material.

The collapsible container 100 can be used for storing and transporting items, as a fabric pot, as a compost, trash, or recycling bin, as a reusable shopping bag, as a cooler for drinks or other items, as a collapsible drinking cup or dog bowl, as a harvest bin, as a fertilizer mixing bin, as a portable swimming pool, as a packaging solution, and/or as a container to contain and/or store water or other fluids, waste, recycling, sports equipment, toys, fishing gear, fish, bait, hunting equipment, meat, harvested items such as fruits, vegetables, nuts, and the like. The material of the bottom portion 115 and the side wall 120 can be selected to be suitable for the desired use. The water-containing ability of the collapsible container 100 allows the collapsible container 100 to be used in various water-containing uses. For example, the collapsible container can be used to hold large amounts of water for irrigation needs, livestock water, or water storage in developing countries. Smaller versions can be used for portable water bowls for pets or for backpacking or the like.

In one version, the collapsible container 100 can also be provided with a lid that can be selectively applied to the top portion 105 to cover the opening 110 when the collapsible container 100 is in the open configuration. The lid can simply lie on top of the top portion or can be attachable to the collapsible container 100 such as by being attachable to the side wall 120 by snaps, Velcro, zipper, or the like. The lid can be made of the same or different material than the side wall 120. When applied over the opening 110, the lid can help contain the contents within the interior 125, protect the contents from dirt and debris, and can keep liquid in the interior 125 from evaporating. In one version, the lid is made of a foldable material and the folded lid can be tucked into the folds of the collapsible container 100 when it is in the collapsed configuration. In one version, the lid can have a portion permanently attached to a portion of the side wall 120.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Therefore, any appended claims should not be limited to the description of the preferred versions contained herein and should include all such alterations, permutations, and equivalents as fall within the true spirit and scope of the present invention.

What is claimed is:

1. A collapsible container comprising:
    a bottom portion and a side wall that define an interior, wherein the bottom portion and the side wall are made of a foldable material;
    a top portion with an opening that allows access to the interior; and
    a rim member connectable to the top portion and sized and shaped to extend around the perimeter of the opening,
    wherein the collapsible container is positionable in an open configuration where the rim member is connected to the top portion in a manner than maintains the opening in an open position, wherein the collapsible container is positionable in a collapsed configuration where at least a portion of the rim member is disconnected from the top portion, and wherein in the collapsed configuration, the collapsible container takes on a substantially flat shape having a longest dimension less than the longest dimension of the opening when the collapsible container is in the open configuration, and wherein the top portion comprises a flap that creates a pocket, wherein at least a portion of the rim member is contained within the pocket, wherein the pocket extends the entire perimeter around the opening, and wherein the rim member is contained within only a portion of the pocket when the collapsible container is in the collapsed configuration.

2. A collapsible container according to claim 1 wherein the rim member is the only rigid structure in the collapsible container.

3. A collapsible container according to claim 1 wherein the bottom portion and the side wall are made of water impermeable material.

4. A collapsible container according to claim 1 wherein the bottom portion and the side wall are made of water permeable material.

5. A collapsible container according to claim 1 further comprising a lid that can cover the opening when the collapsible container is in the open configuration.

6. A collapsible container according to claim 1 wherein the entire rim member is contained within the pocket when the collapsible container is in the open configuration.

7. A collapsible container according to claim 1 wherein the rim member is permanently contained within a portion of the pocket.

8. A collapsible container according to claim 1 wherein the entire rim member is removable from the pocket.

9. A collapsible container according to claim 1 wherein the side wall is cylindrical, wherein the opening is circular, and wherein the rim member is a wire in the form of a circular hoop.

10. A collapsible container according to claim 9 wherein the circular hoop is a collapsible hoop.

11. A collapsible container according to claim 10 wherein the circular hoop can be collapsed by twisting the circular hoop into a FIG. 8 and then doubled over to create a double hoop having a diameter about half the diameter of the uncollapsed circular hoop.

12. A collapsible container comprising:
a bottom portion and a side wall that define an interior, wherein the bottom portion and the side wall are made of a foldable material;
a top portion with an opening that allows access to the interior; and
a rim member connectable to the top portion and sized and shaped to extend around the perimeter of the opening,
wherein the collapsible container is positionable in an open configuration where the rim member is connected to the top portion in a manner than maintains the opening in an open position, wherein the collapsible container is positionable in a collapsed configuration where at least a portion of the rim member is disconnected from the top portion, wherein in the collapsed configuration, the collapsible container takes on a substantially flat shape having a longest dimension less than the longest dimension of the opening when the collapsible container is in the open configuration, and wherein the rim member is contained within the collapsed container when in the collapsed configuration.

13. A collapsible container according to claim 12 wherein the side wall is cylindrical, wherein the opening is circular, and wherein the rim member is a wire in the form of a circular hoop.

14. A collapsible container according to claim 13 wherein the circular hoop is a collapsible hoop.

15. A collapsible container according to claim 12 wherein the circular hoop can be collapsed by twisting the circular hoop into a FIG. 8 and then doubled over to create a double hoop having a diameter about half the diameter of the uncollapsed circular hoop.

16. A collapsible container according to claim 12 wherein the rim member is the only rigid structure in the collapsible container.

17. A method of collapsing a container, the method comprising:
providing a collapsible container comprising
a bottom portion and a side wall that define an interior, wherein the bottom portion and the side wall are made of a foldable material,
a top portion with an opening that allows access to the interior, and
a rim member connectable to the top portion and sized and shaped to extend around the perimeter of the opening;
maintaining the collapsible container in an open position by connecting the rim member to the top portion in a manner that maintains the opening in an open position;
using the container by providing an object in the interior;
disconnecting at least a portion of the rim member from the top portion;
folding the bottom portion and the side wall to collapse the collapsible container into a collapsed configuration, wherein the rim member is contained within the collapsed configuration, and wherein in the collapsed configuration, the collapsible container takes on a substantially flat shape having a longest dimension less than the longest dimension of the opening when the collapsible container is in the open configuration; and
returning the collapsible container to its open position so that it may be used again.

18. A method according to claim 17 wherein the rim member is a collapsible hoop and wherein the method comprises collapsing the collapsible hoop into a double hoop having a reduced diameter.

* * * * *